United States Patent [19]

Wyman et al.

[11] 4,273,176
[45] Jun. 16, 1981

[54] NON-PNEUMATIC TIRE

[75] Inventors: Ransome J. Wyman, Calabases; Richard A. Alshin, Long Beach; Charles H. Gilbert, Fullerton, all of Calif.

[73] Assignee: Carefree Bicycle Tire Company, Marina Del Rey, Calif.

[21] Appl. No.: 37,393

[22] Filed: May 8, 1979

Related U.S. Application Data

[63] Continuation-in-part of Ser. No. 906,691, May 16, 1978, abandoned.

[51] Int. Cl.$^3$ .............................................. B60C 7/12
[52] U.S. Cl. .................................. 152/327; 152/322; 152/324
[58] Field of Search ............... 152/323, 324, 325, 326, 152/327, 329, 379.1, 246, 310, 318, 311, 320, 314, 322, 330 RF, 352 RA, 353 RC, 357 A, 362 R, 157, 155, 209 NT, 400; 156/112, 113; 264/326

[56] References Cited

U.S. PATENT DOCUMENTS

| 365,091 | 6/1887 | Owen | 152/379.1 |
| 862,785 | 8/1907 | Andrew | 152/322 |
| 1,928,524 | 9/1933 | Brunswick | 152/327 |
| 4,127,166 | 11/1978 | Wyman | 152/323 |

OTHER PUBLICATIONS

Rubber World, Jun. 77 Reprint, "Urethane Bicycle Tire Combines Flatproof, Pneumatic Qualities."

Primary Examiner—Michael W. Ball
Attorney, Agent, or Firm—K. H. Boswell

[57] ABSTRACT

A solid monolithic tire for use on a wheel rim can be improved by incorporating within the tire a circumferentially extending tunnel formed on the inside of the tire body. Further, the tire body has inclined side walls that converge outwardly to form a V-shaped cross section. The apex of this V-shaped cross section forms the tread portion of the tire. Each of the side walls of the tire terminate in a thickened portion which forms a bead shoulder capable of seating on the bead flanges of the wheel rim to which the tire is mounted. Extending down through the thickened portion of either side of the tire is a bead which has a lower bead wall on the portion most distal to the thickened portion. A bead cord extends circumferentially embedded within the bead near the lower bead wall. The process by which the tire is formed allows the bead cord to be positioned in its appropriate place within the bead. During this process the bead cord is actively positioned within a mold and the material from which the tire is prepared is injected into the mold surrounding the bead cord.

10 Claims, 6 Drawing Figures

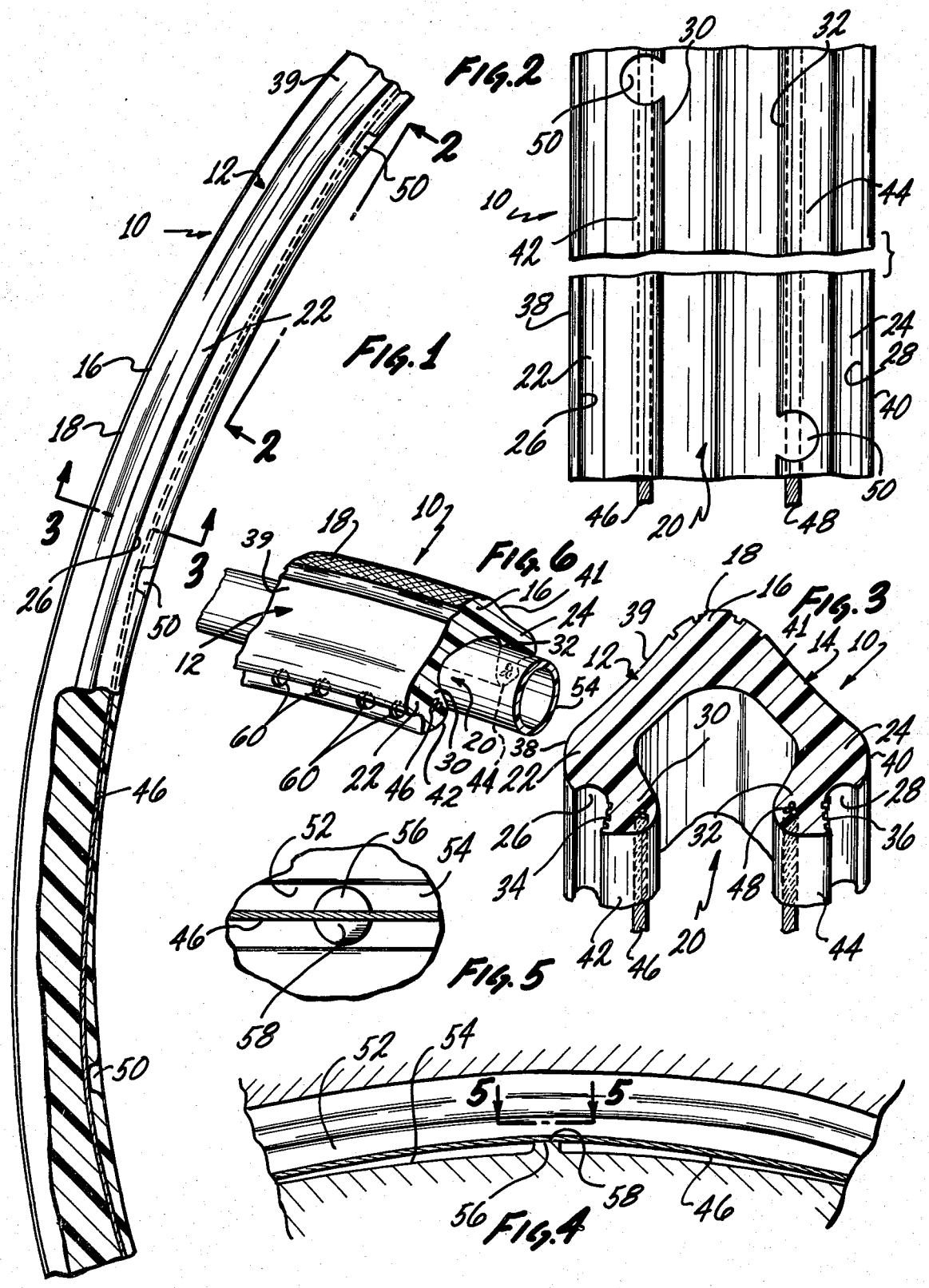

NON-PNEUMATIC TIRE

CROSS REFERENCE TO RELATED APPLICATIONS

This application is a continuation in part of our application Ser. No. 906,691, filed May 16, 1978, now abandoned, and entitled BICYCLE TIRE WITH COMPRESSION AMPLIFICATION; the disclosure of which is herein incorporated by reference.

BACKGROUND OF THE INVENTION

The present invention pertains to a new and improved form of a non-pneumatic tire of the type used on vehicles having narrow rims such as bicycles, wheel chairs and the like and to a process of preparing the same which allows for proper placement of a bead cord within the beads of the tire.

The typical type of bicycle tire on the market is a pneumatic tire which is constructed much like an automobile tire having a cord carcass and steel wire embeded within the beads of the tire. This type of tire requires the use of a tube since the tire rim has plurality of spokes attached to the rim which inhibits the use of a tubeless type tire. For light weight bikes used in cross-country riding and in racing a tire is used which requires a tube to be laced within a very light weight tire. This racing type tire suffers from the same type of disadvantages outlined below for the common tire in addition to it being very time consuming and tedious to lace the tube within the tire.

The disadvantages of pneumatic bicycle tires include safety hazards due to blowouts and punctures as well as very poor service life due to relatively thin treads. The thin treads contribute to the safety hazard in that they are easily punctured by common sharp objects found in the roads, such as nails or glass and further they even can be damaged by sharp stones.

With increasing cost consciousness the quality of the tubes used in the common bicycle tire, such as that found on a child's bicycle, has decreased and typically at the junction where the stem of the tube is molded to the tube leakage of air can occur. To combat this leakage of air it is necessary to either carry a tire pump to keep the tires properly inflated or continually make trips to a service station to inflate the tire with compressed air.

There have been attempts to overcome some of the above outlined disadvantages by filling the tire with a urethane resin in place of an inflatable tube. This requires filling the tire with a mixture of two components which react within the tire to form a solid resilient elastomeric body within the tire. This type of tire filling has been used successfully for automobile tires. This approach has been used with bicycle tires and tires filled with urethane do eliminate problems such as blowouts, slow leaks and underinflation, but they create a new problem in regards to weight. A typical urethane filled bicycle tire will weigh up to five or six pounds per tire making a total weight penalty to up to ten pounds for the bicycle. Since the bicycle is propelled by pedal power, weight is considered a grave disadvantage. A bicycle enthusiast thinks of his tires in terms of minimum ounces or grams and not in terms of pounds or kilograms. A further disadvantage of a urethane filled tire is that the ride is harder and the rolling resistance is increased. Ride comfort and rolling resistance are mutually antagonistic quantities. Attempts to maximize one of these properties results in jeopardizing the other and it is usually necessary to make a compromize between them.

Once a tire is filled with urethane forming resins which react or cure to form a solid body within the tire it is almost impossible to remove the tire from the wheel rim for spoke repairs or adjustments because not only does the tire have to be removed from the rim but it also has to be removed from the solid urethane body which was formed between the tire and the rim. Normally removal of a tire in a case such as this is impossible without actually cutting the tire and destroying it. An advantage of a tubed tire and a disadvantage of a solid urethane filled tire is the distribution of stress upon impact of the tire against a sharp object. The tubed tire can distribute this stress wherein the solid filled tire cannot and the stress is therefore transmitted to the wheel rim damaging it.

Recently, efforts have been made to develop a solid, monolithic type of urethane elastomer having a tunnel on the inside to allow the tire to compress under impact loads. However, this has proved to be a difficult thing to achieve, as a tire made of a urethane soft enough to give a comfortable ride, turns out to have unsatisfactory resistance to wear and cuts, while urethane hard enough to give good resistance to wear and cuts gives a hard, uncomfortable ride.

One of the more difficult problems with a solid, monolithic tire of urethane elastomer having a tunnel on the inside, is the tendency of the tires to come off the rims, even though they are glued to the rim with an adhesive. This is due, in part, to the fact that the only thing holding the tire bead shoulders against the rim is the adhesive bond, which is frequently less than perfect owing to the difficulty of getting a uniform film of adhesive on the mating surfaces. Another contributing factor is the elasticity of the unreinforced elastomer, which allows the tire to stretch under certain loading conditions. The problem is particularly acute when a side thrust is applied to the tire, as when cornering or bumping against a curb or simply turning the wheel when the tire is not rolling as when a rider is stopped waiting for a traffic light or other such instance.

SUMMARY OF THE INVENTION

In view of the above it is considered that there exists a need for new and improved tires which, inter alia, could be used on vehicles having thin wheel rims such as bicycles. It is a general object of this invention to fulfill this need. It is an additional object to provide a tire that is long lasting, combines adequate ride qualities with rolling resistance qualities, is economical to manufacture and therefore readily available to a wide segment of consumers.

In view of the above objects and others that will become evident from the remainder of this specification a tire having a solid monolithic tire body made of a urethane elastomer for use on a wheel rim having a pair of laterally spaced side walls and a circumferential channel forming the bottom of the rim can be improved by providing the tire body with a circumferentially extending channel formed on the inside of a tire body and having the tire body having inclined side walls that converge outwardly to form a V-shaped cross section the apex of which forms the tread portion of the tire; further each of the side walls terminates in a thickened portion which forms a bead shoulder that seats on the bead flanges of the wheel rim. The thickened portion includes a bead which extends essentially downward and the portion of the bead which is distal from the thickened portion forms a lower bead wall. Within the bead wall is a bead cord which extends circumferentially within said bead proximal to said lower bead wall. When the tire is fitted on the rim said cord is positioned within the rim between the side walls and the bottom of the rim.

In a preferred embodiment, the bead cord is held within the bead in the shape of a multisided polygon having arcuate shaped sides. Located in the lower bead wall and extending from the surface of the lower bead wall towards said thick portion and terminating at the bead cord are a multiplicity of small cavities.

The process of manufacturing the invention includes locating the bead cords within a cavity within a mold. The mold includes two annular cavities corresponding to two symmetrical halves of the tire as viewed in cross section. The cord is held by a series of projections above that surface of the mold which defines the lower bead wall. The cord rests on these projections and when the liquid material from which the tire is formed is injected into the mold, the liquid material flows around the bead cord between the bead cord and that portion of the mold which forms the lower bead cord wall securely embeding the bead cord in the bead of the tire.

BRIEF DESCRIPTION OF THE DRAWINGS

This invention will be better understood when taken in conjunction with the drawing wherein:

FIG. 1 shows a side elevational view in partial section of the invention;

FIG. 2 shows a bottom plan view of that portion of FIG. 1 about the line 2—2 of FIG. 1;

FIG. 3 is a cross sectional view of the invention shown in FIG. 1 taken at the line 3—3 of FIG. 1;

FIG. 4 is a side elevational view in section of a portion of a mold used during the process of the invention to form the invention;

FIG. 5 is a top plan view of a portion of that portion of the mold shown in FIG. 4 about the line 5—5 of FIG. 4;

FIG. 6 is a partial isometric view of the invention and a mounting tube with the beads shown in an alternate embodiment.

The invention shown in the drawings and described in this specification utilizes certain principles and concepts as are set forth and defined in the appended claims. Those skilled in the art to which this invention pertains will realize that these principles and concepts could be used with a variety of differently appearing and differently described embodiments. For this reason the invention is not to be construed to be limited to the exact embodiments described and depicted but is to be construed in light of the claims.

DETAILED DESCRIPTION

A tire generally depicted by the numeral 10 is made up of a solid monolithic body. This body is divided into several general areas. These include two side walls 12 and 14 which converge outwardly to form a V-shape when viewed in cross section such as in FIG. 3. A crown 16 formed at the apex of side walls 12 and 14 has a tread pattern 18 on its outer surface. The crown 16 and the tread pattern 18 thereon extend over only approximately about one third of the width of the total tire and as such the portion of the tire meeting the road surface is quite small which significantly reduces the rolling friction between the tire and the road surface. However, because of the unique shape and construction of the tire excellent wear and ride characteristics are achieved.

A tunnel 20 extends within the interior of the side walls 12 and 14 circumferentially around the inside of the tire 10. The portions of the side walls 12 and 14 and the crown 16 which form this tunnel are generally elliptical in shape as viewed in cross section shown in FIG. 3. This elliptical shape results in distribution of force from the crown 16 along the side walls 12 and 14 in such a manner as to provide a smooth ride when the tire is in use. The side walls 12 and 14 both terminate into thickened portions 22 and 24 respectively which have shoulders 26 and 28 respectively on their underside. Extending down from the thickened portions 22 and 24 are beads 30 and 32 respectively. The outside walls 34 and 36 of the beads 30 and 32 project down from the thickened portions 22 and 24 at a slight oblique angle and are essentially flat.

When the tire is mounted to the rim the beads 30 and 32 fit within the bead flanges of the rim until the shoulders 26 and 28 rest on top of the bead flanges. The outside walls 34 and 36 are then positioned flush against the bead flanges of the rim.

The outer walls 38 and 40 respectively of the thickened portions 22 and 24 are rounded such that they do not extend to a great degree beyond the outside of the wheel bead flanges. This prevents the bead flanges of the rim from cutting into the edges of the tire.

The outside surfaces 39 and 41 of the side walls 12 and 14 respectively have a general concave shape. The concavity of the surfaces of side walls 12 and 14 as well as the general cross sectional shape of the tire contribute to ride characteristics as set forth in my application Ser. No. 906,691 the disclosure of which is herein incorporated and as such will not be further amplified in this specification.

Located near the lower walls 42 and 44 respectively of beads 30 and 32 are bead cords 46 and 48. These bead cores 46 and 48 are embedded within the beads 30 and 32 and extend around the tire in an essentially circumferentially manner. In the preferred embodiment of this invention shown in FIG. 1 the shape that these cords 46 and 48 assume within the beads 30 and 32 is that of a multisided closed polygon having arcuate shaped sides. This placement of the cords 46 and 48 within the beads 30 and 32 is a direct result of the process for forming the tire as hereinafter described. Essentially symmetrically placed around the perimeters of the lower walls 42 and 44 are a series of cavities collectively identified by the numeral 50. The cords 46 and 48 extend around the cavities 50 such that the sections of the cords 46 and 48 in between the cavities 50 are arcuate in shape and at the cavities 50 these arcuate sections form an angle with each other resulting in the multisided polygonal shape of the cords 46 and 48.

The tire 10 is preferably formed of a urethane elastomer as set forth in my application Ser. No. 906,691. In addition to the resins used to form the urethane elastomer a fluorescent pigment can be incorporated within the elastomer to provide for improved safety in that the pigment serves as a light reflector making the tire more visible at night not only when illuminated by a direct light, such as an automobile headlight, but also by indirect light such as street lights and reflected sunlight at dusk. Useful fluorescent pigment would include Day-Glo.

The bead cords 46 and 48 are preferably a nylon cord which contributes great strength with a minimum of weight. Further the nylon cord is compatible with the urethane elastomers preferably used for the tire body. The nylon bead cords 46 and 48 incorporated within the beads 30 and 32 serve several important functions. Preferably the tires are formed slightly undersized and when mounted on a rim the tension created by the cord firmly holds the monolithic tire onto the rim. Hereinafore difficulties have been encountered with monolithic bicycle tires because the rim sizes from different manufacturers show a degree of variability. The use of the cord within the bead allows the use of a single tire size on a variety of rims which although they are designated by different manufacturers to be a standard size, i.e. rim diameter, they are in effect of slightly different sizes, i.e. rim cross section measurement. The cords are further useful in the demolding portion of the process utilized in manufacturing the tires.

In the process used in forming the tire a flexible mold preferably having two sections, each section corresponding to one half of the tire as viewed in cross section and taken along an axis passing through the crown on two points on opposite sides of the tire, is used. Each of these two sections has an annular cavity in it and when the sections of the mold are mated the two annular cavities combine to form the shape of the tire. FIG. 4 shows a portion of one of the two sections of the mold as viewed from the interior of the tunnel 20 towards the outside wall 34 of the bead 30. This portion of the mold therefore corresponds to the portion of the mold wherein bead 30 is formed. The outside wall 34 of bead 30 would be formed against the surface of mold wall 52 and the lower wall 42 of bead 30 would be formed against the surface of mold wall 54. Projecting from the surface of mold wall 54 are a plurality of upstanding placement pegs collectively identified by the numeral 56.

In the process in forming the tires a circular band of a bead cord is inserted into the mold such that it fits into the annular cavity formed in part by mold walls 52 and 54. This band of bead cord rests against the top surfaces 58 of the placement pegs 56. The placement pegs 56 are chosen in respect to placement and number such that the segment of the band of bead cord stretching over any two adjacent placement pegs 56 is suspended within the mold in a manner such that only a very short segment, if any, of the band of the bead cord touches mold wall 54.

After the band of bead cord is placed within the cavities of the mold the two sections of the mold are assembled. These two assembled sections are placed between two platens or other equivalent structures. The platens are fixedly held in respect to one another such as placing them between the faces of a large press capable of exerting a minor pressure on them. The platens serve to retain the two pieces of the flexible mold in a rigid alignment with each other so that the cavities within these two sections of the molds are maintained in their proper shape and are not distorted when they are filled. For production purposes usually a series of molds alternately placed between platens are held within an appropriate structure such as a press.

The appropriate starting materials for the tire body are injected into the mold in a fluid state under appropriate conditions compatible with the particular material being used, i.e. proper temperature and pressure as is known in the art for this type of molding technique. The material flows into the mold and around the bead cords 46 and 48 embeding the bead cords 46 and 48 in the area corresponding to where the beads 30 and 32 will be formed.

The bead cord is generally chosen to be a multistranded material twisted in a helix. The fluid material will flow around the individual strands of this bead cord thus totally covering the surface of the bead cord except if the bead cords touch a short segment of the surface of mold wall 54. If this happens the fluid material will still flow between the individual strands of the cord and only small points on the surfaces of the strands will not be covered with the fluid material.

The tire is left in the mold only sufficiently long for an initial curing period to elapse in which the fluid material of the tire starts to polymerize or solidify and the tire obtains some green strength. At this point the demolding can be performed. Final strength of the tire is of course not obtained with this relatively short stay in the mold.

Further curing will proceed after the tire is demolded however, the tire can be demolded prior to obtaining full strength because of two important features of the process. The most complex portion of the tire, geometrically, is that area that includes the thickened portions 22 and 24 in combination with the bead portions 30 and 32. The first feature which allows this complex portion to be demolded prior to obtaining full strength is because the molds which are used in the process are flexible, they give or flex. This allows the mold to absorb some of the distortion forces upon removing the thickened and the bead portions from the annular cavities of the mold. Secondly the cords 46 and 48 impart to the green tire, particularly to the thickened and bead portions, additional strength and upon withdrawal of these portions from the mold the cords further distribute the distortion forces.

After molding the tire 10 and, of course, after sufficient time has elapsed to complete curing of said tire as per the requirements dictated by the resins used, the tire can be mounted on an appropriate rim. As noted above, bicycles rims, although they are the same wheel size diameter they may have variances in both the depth of the side rim and the spacing between the side rims. For use in maintaining the beads 30 and 32 in place against the sidewalls of the tire rim when the tire is mounted on the rim a segment of semi-resilient tubing 54 such as polyethylene tubing is inserted within the tunnel 20 of the tire 10. FIG. 6 shows a portion of the tire 10 having the tubing 54 within the tunnel 20. The tubing 54 spreads the beads 30 and 32 and holds the outer walls 34 and 36 within the rim. The use of the tubing 54 allows the use of a single sized tire on all of the standard rim diameters corresponding to the tire diameter. Thus, in effect the tubing 54 spreads the beads 30 and 32 in an amount to compensate for the lack of standarization among the rim sizes.

The piece of tubing 54 used is cut so that when encircled around the wheel rim the two ends of the tubing (not separately shown or numbered) just abut against each other or are spaced a slight distance away from each other. Normally for a 27 inch tire to be used on a 27 inch bicycle rim a piece of tubing 54 having an approximate outside diameter of one half inch will allow the tire 10 to be used on almost all varieties of 27 inch sized rims. In our application Ser. No. 906,691, we described an H-shaped bead lock insert. It has been found that with the improved tire herein described a simple segment of round tubing is sufficient to insure that the beads are properly seated against the wheel rim. This tubing has several advantages, among those being it is extremely inexpensive since it is commercially available in large quantities and requires no special tooling or forming. Further it is available in a multiplicity of different sizes which can be used on different diameter wheel rims accordingly. But, most importantly it allows for the use of a single tire size to be used on a variety of wheel rims all designated to be the same diameter but in effect having different tire width and rim depth. Additionally since the tubing is very thin walled it contributes little additional weight to the tire.

After appropriately mounting one of the beads 30 or 32 on the wheel rim a segment of the tubing 54 is inserted within the tunnel 20 and then the other bead is slipped over the wheel rim. Since the tubing 54 is only used to spread the beads 30 and 32 it matters not if it is punctured or subjected to other common road hazards previously delineated above.

Aside from showing the tubing 54 within the tire 10, FIG. 6 also shows an alternate embodiment of the beads 30 and 32. This embodiment would find its greatest utility for use by racers and long distance riders wherein tire weight is extremely critical as opposed to the casual everyday bike rider. Extending along the walls 34 and 36 of the beads 30 and 32 are a plurality of holes collectively identified by the numeral 60. These holes effectively eliminate material from the tire without inhibiting its functionality and performance. Depending upon the depth of these holes into the beads 30 and 32 between five and ten percent of the tire weight can be eliminated. The holes 60 are formed by equipping the mold with a series of nobs (not shown or numbered) along wall 52.

We claim:

1. An improvement in a non-pneumatic tire having a solid monolithic true body made of a urethane elastomer for the use on a wheel rim having a pair of laterally spaced bead flanges and side walls and a circumferential channel forming the bottom of the rim which comprises:

said tire body having a circumferentially extending tunnel formed on the inside of said tire body;

said tire body having inclined side walls that converge outwardly from each other, the apex of said side walls forming a crown, the tread portion of the tire located at said crown;

each of said side walls terminating in a thickened portion forming a bead shoulder that seats on the top of the head flanges of said wheel rim and including a bead extending essentially downward from said thickened portion;

the portion of said beads distal to said thickened portion forming a lower bead wall;

a bead cord extending essentially circumferentially within said bead proximal to said lower bead wall;

each of said beads fitting into said rim adjacent to one of said walls positioning said cords within said rim between said bead flanges and said bottom of said rim;

said bead cord is held within said bead in the shape of a multisided closed polygon having arcuate shaped sides.

2. The tire of claim 1 wherein:

the cross sectional shape of the section of said tunnel proximal to the tread portion of said tire is essentially elliptical in shape and each of said beads includes an essentially flat outside wall projecting outwardly at a small oblique angle, said outside walls fitting flush against said bead flanges of said rim.

3. The tire of claim 1 including:

a fluorescent pigment incorporated within said urethane elastomer.

4. The tire of claim 1 wherein:

the outside surface of said thickened portion intermediate said bead shoulder and said side wall is essentially rounded in shape.

5. An improvement in a non-pneumatic tire having a solid monolithic tire body made of a urethane elastomer for the use on a wheel rim having a pair of laterally spaced bead flanges and side walls and a circumferential channel forming the bottom of the rim which comprises:

said tire body having a circumferentially extending tunnel formed on the inside of said tire body;

said tire body having inclined side walls that converge outwardly to form a V-shaped cross section, the apex of which forms the tread portion of the tire;

each of said side walls terminating in a thickened portion forming a bead shoulder that seats on the top of the bead flanges of said wheel rim and including a bead extending essentially downward from said thickened portion;

the portion of said beads distal to said thickened portion forming a lower bead wall;

a bead cord extending essentially circumferentially within said bead proximal to said lower bead wall;

each of said beads fitting into said rim adjacent to one of said walls positioning said cords within said rim between said bead flanges and said bottom of said rim;

said bead cord is held within said bead in the shape of a multisided closed polygon having arcuate shaped sides.

6. The tire of claim 5 including:

said bead having a multiplicity of cavities in said lower bead wall extending from the surface of said lower bead wall into said bead toward said thickened portion and terminating proximal to said cord.

7. The tire of claim 6 wherein:

the number of said cavities is equal to the number of arcuate sides of said polygon.

8. The tire of claim 7 wherein:

each of said multiplicity of cavities terminates at the intersection point wherein two adjacent arcuate sides of said multiplicity of arcuate sides of said polygon meet.

9. The tire of claim 5 wherein:

the cross sectional shape of the section of said tunnel proximal to the tread portion of said tire is essentially elliptical in shape;

the outside surface of said thickened portion intermediate said bead shoulder and said side wall is essentially rounded in shape.

10. The tire of claim 5 including:

a fluorescent pigment incorporated within said urethane elastomer.

* * * * *

UNITED STATES PATENT AND TRADEMARK OFFICE
CERTIFICATE OF CORRECTION

PATENT NO. : 4,273,176
DATED : JUNE 16, 1981
INVENTOR(S) : WYMAN ET AL.

It is certified that error appears in the above-identified patent and that said Letters Patent are hereby corrected as shown below:

In claim 1, line 2, delete the word "true" and in its stead insert the word --tire--.

Signed and Sealed this

Twenty-seventh Day of October 1981

[SEAL]

Attest:

GERALD J. MOSSINGHOFF

*Attesting Officer*  *Commissioner of Patents and Trademarks*